United States Patent
Kim et al.

(10) Patent No.: US 9,230,770 B2
(45) Date of Patent: Jan. 5, 2016

(54) CONDUCTIVE NANOSTRUCTURE, METHOD FOR MOLDING SAME, AND METHOD FOR MANUFACTURING A FIELD EMITTER USING SAME

(75) Inventors: Yong Hyup Kim, Seoul (KR); Wal Jun Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 122 days.

(21) Appl. No.: 13/704,902

(22) PCT Filed: Feb. 23, 2011

(86) PCT No.: PCT/KR2011/001250
§ 371 (c)(1),
(2), (4) Date: Feb. 14, 2013

(87) PCT Pub. No.: WO2011/159012
PCT Pub. Date: Dec. 22, 2011

(65) Prior Publication Data
US 2013/0134860 A1    May 30, 2013

(30) Foreign Application Priority Data

Jun. 17, 2010  (KR) .................. 10-2010-0057576

(51) Int. Cl.
*H01J 19/06*    (2006.01)
*H01K 1/04*    (2006.01)
(Continued)

(52) U.S. Cl.
CPC . *H01J 9/025* (2013.01); *B23H 9/00* (2013.01); *H01B 1/04* (2013.01); *H01B 1/08* (2013.01); *H01J 1/304* (2013.01); *H01J 1/3044* (2013.01); *H01J 2201/30411* (2013.01);
(Continued)

(58) Field of Classification Search
CPC ........... H01B 1/04; H01B 1/08; H01J 1/3044; H01J 9/025; H01J 1/304; H01J 2201/30434; H01J 2201/30449; H01J 2201/30469; H01J 2201/30411; B23H 9/00
USPC ......... 313/422, 495, 496, 497, 310, 311, 309, 313/306, 307, 346 R, 351, 325; 445/46, 50, 445/51, 24, 35; 219/69.17, 69.15
See application file for complete search history.

(56) References Cited

U.S. PATENT DOCUMENTS 5,498,848 A * 3/1996 Wakabayashi ........... B23H 9/00
                                                               219/69.17
6,283,812 B1   9/2001 Jin et al.
(Continued)

FOREIGN PATENT DOCUMENTS

| JP | 2007-257950 A | 10/2007 |
| JP | 2009-104928 A | 5/2009 |
| KR | 10-0903857 B1 | 6/2009 |

*Primary Examiner* — Anh Mai
*Assistant Examiner* — Glenn Zimmerman
(74) *Attorney, Agent, or Firm* — Sughrue Mion, PLLC (57) ABSTRACT

The present invention relates to a conductive nanostructure, a method for molding the same, and a method for manufacturing a field emitter using the same. More particularly, the present invention relates to a field-emitting nanostructure comprising a conductive substrate, a conductive nanostructure arranged on the conductive substrate, and a conductive interfacial compound disposed in the interface between the conductive substrate and the conductive nanostructure, as well as to a method for molding the same, and a method for manufacturing a field emitter using the same.

9 Claims, 9 Drawing Sheets (51) Int. Cl.
*H01J 9/02* (2006.01)
*H01B 1/04* (2006.01)
*H01B 1/08* (2006.01)
*H01J 1/304* (2006.01)
*B23H 9/00* (2006.01)

(52) U.S. Cl.
CPC ............... *H01J 2201/30434* (2013.01); *H01J 2201/30449* (2013.01); *H01J 2201/30469* (2013.01)

(56) References Cited

U.S. PATENT DOCUMENTS

| | | | |
|---|---|---|---|
| 6,645,402 B1* | 11/2003 | Kurokawa et al. | 252/502 |
| 6,998,563 B1* | 2/2006 | Miao | 219/69.15 |
| 2006/0065546 A1* | 3/2006 | Curodeau | B23H 1/04 205/640 |
| 2006/0240238 A1* | 10/2006 | Boussaad et al. | 428/293.4 |
| 2009/0288809 A1* | 11/2009 | Shigyo et al. | 165/133 |
| 2010/0156272 A1* | 6/2010 | Kim et al. | 313/495 |

* cited by examiner

CONDUCTIVE NANOSTRUCTURE, METHOD FOR MOLDING SAME, AND METHOD FOR MANUFACTURING A FIELD EMITTER USING SAME

CROSS REFERENCE TO RELATED APPLICATIONS

This application is a National Stage of International Application No. PCT/KR2011/001250, filed on Feb. 23, 2011, which claims priority from Korean Patent Application No. 10-2010-0057576, filed on Jun. 17, 2010, the contents of all of which are incorporated herein by reference in their entirety.

BACKGROUND OF THE INVENTION

1. Field of the Invention

The present invention relates to a conductive nanostructure, and more particularly, to a conductive nanostructure, a method for molding the same, and a field emitter using the same through an electrical discharge machining.

2. Description of the Related Art

CNT and nanostructures including the same have been developed recently in the field of nano-technologies. Typical application of the nanostructures is field emission tip of electrical apparatus such as an atomic force electron microscope. The field emission tip should have excellent electron emission efficiency according to fields. In specifically, when the field emission tip of atomic force electron microscope is employed, it is required to have high strength not to be easily broken in impact with surface of workpiece. As a result, it can reliably measure a contact structure of high aspect ratio with high resolution. In order tot secure high resolution, it is advantageous for the field emission tip to be manufactured in a geometric structure having high aspect ratio.

CNT as nanostructures used to the field emission tip has excellent chemical resistance and mechanical strength and realizes geometric structure with high aspect ratio itself. Accordingly, CNT is a promising substitution. As an attempt to CNT as a probe of field emission tip of an atomic force electron microscope, It has been a recent technological trend in forming a needle-shaped CNT at an apex of a field emission element. Korean Laid-Open Patent Publication No. 2005-0060308 discloses a method for sticking CNT to a tip using adhesion. Also, Korean Laid-Open Patent Publication No. 2002-0040133 concretely discloses a catalyst is formed on a metal tip and a method for directly growing CNT by a CVD (Chemical Vapor Deposition) process using the catalyst.

It is necessary to reliably manufacture nanostructures capable of controlling aspect ratio, excellent adhesion with substrates such as a metal tip, and having excellent electrical property such high electron emission efficiency.

BRIEF SUMMARY OF THE INVENTION

Accordingly, the present invention is to address the above-mentioned problems and/or disadvantages and to offer at least the advantages described below.

It is, accordingly, an object of the present invention to provide a method for molding a nanostructure to arrange the nanostructure with a predetermined size on a conductive substrate.

It is another object of the present invention to provide a method for manufacturing a field emitter having a conductive nanostructure arranged to have a predetermined length on a conductive tip.

It is still another object of the present invention to provide a nanostructure and a field emitter capable of mechanically controlling an aspect ratio and excellent electrical properties.

Embodiments of the present invention provide a field-emitting nanostructure comprising a conductive substrate, a conductive nanostructure arranged on the conductive substrate, and a conductive interfacial compound arranged on interfaces between the conductive substrate and the conductive nanostructure.

In some embodiments of the present invention, an apex cross-section of the conductive nanostructure has a surface step under 1 µm by an electrical discharge machining.

In some embodiments of the present invention, the electrical discharge machining is carried out in an air environment.

In some embodiments of the present invention, the conductive nanostructure is vertically formed on the conductive substrate.

In some embodiments of the present invention, the conductive substrate includes tungsten, the conductive nanostructure includes tungsten oxide and CNT (carbon nanotube), and the conductive interfacial compound includes tungsten carbide.

Embodiments of the present invention provide a field emitter comprising, a conductive tip, a conductive nanostructure for emitting electron by an external field arranged on the conductive tip, and a conductive interfacial compound on interfaces between the conductive tip and the conductive nanostructure.

In some embodiments of the present invention, the conductive nanostructure is formed in an air environment by an electrical discharge machining and has a surface step under 1 µm.

In some embodiments of the present invention, the conductive tip is tungsten, nickel, molybdenum, tantalum, niobium, or alloy thereof.

In some embodiments of the present invention, the conductive interfacial compound is formed by an electrical discharge machining and generates low contact resistance between the conductive tip and the conductive nanostructure.

In some embodiments of the present invention, a threshold field of the field emitter is varied depending on an aspect ratio of the conductive nanostructure.

In some embodiments of the present invention, the conductive tip includes tungsten, the conductive nanostructure includes tungsten oxide and CNT (carbon nanotube), and the conductive interfacial compound includes tungsten carbide.

Embodiments of the present invention provide a method for molding a conductive nanostructure comprising the steps of (a) a process for forming a conductive nanostructure arranged on a conductive substrate, and (b) an electrical discharge machining process for conductive nanostructure in an air environment.

In some embodiments of the present invention, a conductive interfacial compound is formed between the conductive substrate and the conductive nanostructure in the (b) step.

In some embodiments of the present invention, a contact resistance between the conductive substrate and the conductive nanostructure is reduced in the (b) step.

In some embodiments of the present invention, the conductive nanostructure includes CNT (carbon nanotube).

In some embodiments of the present invention, the conductive nanostructure additionally includes metal or metallic oxide.

In some embodiments of the present invention, the (b) step includes an electrical discharge cutting process for the conductive nanostructure to have a predetermined length.

In some embodiments of the present invention, the (b) step comprises (b1) a process for providing an electrical discharge machining electrode, and (b2) a process for generating an electrical discharge between the conductive nanostructure and the electrical discharge machining electrode.

In some embodiments of the present invention, the (b) step comprises the steps of (b1) a process for isolating and arranging the conductive nanostructure and the electrical discharge machining electrode in an air environment, (b2) a process for applying a voltage between the conductive nanostructure and the electrical discharge machining electrode, and (b3) a process for closing the conductive nanostructure to the electrical discharge machining electrode in which the voltage is applied to generate an electrical discharge.

In some embodiments of the present invention, the electrical discharge machining electrode is formed in a wire or cylindrical shaped.

In some embodiments of the present invention, the electrical discharge machining electrode is at least one selected from the group consisting of brass, graphite, silver-tungsten alloy, copper-tungsten alloy, iron, copper, zinc, phosphor bronze and aluminum or alloy thereof.

Embodiments of the present invention provide a method for molding a field emitter comprising the steps of (a) a process for forming a conductive nanostructure arranged on a conductive tip and including CNT (carbon nanotube), and (b) an electrical discharge cutting process for the arranged conductive nanostructure in an air environment, wherein a contact resistance between the conductive tip and the conductive nanostructure is reduced in the (b) step.

In some embodiments of the present invention, a conductive interfacial compound is formed between the conductive tip and the conductive nanostructure in the (b) step.

In some embodiments of the present invention, the (b) step comprises the steps of (b1) a process for isolating and arranging the conductive nanostructure and the electrical discharge machining electrode in an air environment, (b2) a process for applying a voltage between the conductive nanostructure and the electrical discharge machining electrode, and (b3) a process for closing the conductive nanostructure to the electrical discharge machining electrode in which the voltage is applied to generate an electrical discharge.

In some embodiments of the present invention, the electrical discharge machining electrode is at least one selected from the group consisting of brass, graphite, silver-tungsten alloy, copper-tungsten alloy, iron, copper, zinc, phosphor bronze and aluminum.

In some embodiments of the present invention, the (b) step includes a process for adjusting an aspect ratio of the cut nanostructure to control an electron emission threshold field.

Embodiments of the present invention provide an field-emitting nanostructure having a threshold field ranged from 0.64 V/$\mu$m to 0.74 V/$\mu$m when a discharge current density is 10 mA/cm$^2$.

Embodiments of the present invention provide an field-emitting nanostructure having an applied field is under 2.0 V/$\mu$m when total discharge current is 10 mA.

Other aspects, advantages, and salient features of the invention will become apparent to those skilled in the art from the following detailed description, which, taken in conjunction with the annexed drawings, discloses exemplary embodiments of the invention.

Advantageous Effects

As above mentioned, according to an embodiment of the present invention, the size and shape of a conductive nanostructure can be controlled finely using an electrical discharge machining in an air environment.

Also, the physical adhesion between a conductive nanostructure and a conductive substrate can be enhanced, and the contact resistance therebetween can be reduced in the course of an electrical discharge machining in an air environment.

Furthermore, a field emitter having excellent electron emission efficiency can be manufactured on a conductive tip by employing the above-mentioned electrical discharge machining.

DETAILED DESCRIPTION OF THE INVENTION

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Figure 1:
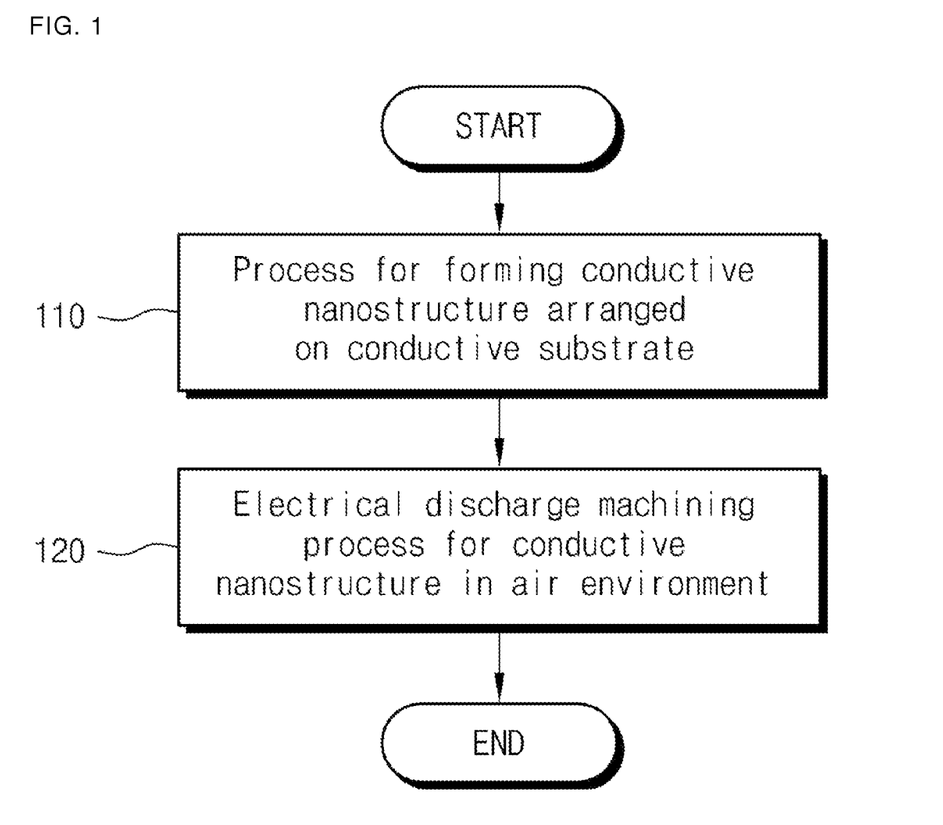
FIG. 1 is a flowchart illustrating a method for molding a conductive nanostructure in accordance with an embodiment of the present invention.

FIG. 1 is a flowchart illustrating a method for molding a conductive nanostructure in accordance with an embodiment of the present invention.

Referring to FIG. 1, in a block 110, a conductive nanostructure is formed on a conductive substrate. According to an embodiment of the present, the conductive substrate may be formed of metal, conductive metal oxide, conductive metal nitride, and the like. As an example, the conductive substrate may be tungsten, nickel, molybdenum, tantalum, niobium, or alloy thereof. As another example, the conductive substrate may be tungsten nitride, tantalum nitride, titanium nitride, and the like.

Also, the conductive nanostructure may include CNT (carbon nanotube, hereinafter, referred to as "CNT"). In some embodiments, the conductive nanostructure includes metal or metallic oxide additionally.

The conductive nanostructure arranged on the conductive substrate is formed by well-known methods. The conductive substrate according to the present invention has various shapes such as a tip in which one end thereof is sharp) depending on their applications and also widely applicable as a various kinds of supporters in which the conductive nanostructure is arranged.

In forming the conductive nanostructure arranged on the conductive substrate, chemical vapor deposition (CVD) using catalyst can be used. The CVD may be heat CVD, DC plasma CVD, RF (Radio frequency) CVD, or Microwave CVD. As an embodiment, metal catalyst such as iron, cobalt, nickel is formed on the conductive substrate. In forming the metal catalyst on the conductive substrate, a sputtering process may be used. After that, process gas like acetylene gas ($C_2H_2$) is provided to the conductive substrate where the metal catalyst is formed and various kinds of CVDs are employed, thereby forming a nanostructure like CNT on the conductive substrate. The phenomenon of CNT on the metal catalyst is well known as tip-growth theory or base-growth theory. There is an advantage of CVD in that CNT is vertically arranged on the conductive substrate. According to an embodiment, the metal catalyst is uniformly arranged on the conductive substrate, thereby forming a plurality of CVDs uniformly arranged on the conductive substrate.

In a block 120 of FIG. 1, an electrical discharge machining is performed to the conductive nanostructure in an air environment. According to an embodiment, the electrical discharge machining may be a cutting process for the conductive nanostructure to have a predetermined length. As an example, if the conductive nanostructure is applied as an electron-emitting element, it is very important that the length of the conductive nanostructure is finely controlled by applications. The inventor of the present invention noticed that the aspect ratio (length element with respect to diameter) of the conductive nanostructure is related to the size of electron emission threshold field of the electron emission element. In other words, the larger the aspect of the conductive nanostructure is, the lower the electron emission threshold field is. As a result, electrons are emitted in a relatively low voltage. And, the inventor noticed that the uniformity of the electron emission field becomes improved as an apex cross-section of the nanostructure is uniform. Accordingly, a technique for finely and reproductibilitly controlling the length and cross-section of the conductive nanostructure contributes to manufacture electron emission elements with uniform electron emission threshold field size.

According to an embodiment, currents of several mA to A flow along the conductive nanostructure and the conductive substrate during the electrical discharge machining. The inventor noticed that a contact resistance on interfaces between the conductive nanostructure and the conductive substrate is reduced by currents flowing on the conductive nanostructure and the conductive substrate. It is estimated that Joule heat created by the currents can generate conductive compound on interfaces between the conductive nanostructure and the conductive substrate, and the generated conductive compound reduces the contact resistance on the interfaces. Also, the conductive compound on the interfaces increases physical adhesion between the conductive nanostructure and the conductive substrate, thereby stably arranging the conductive nanostructure on the conductive substrate.

According to some embodiments, the electrical discharge machining may be adopted in cutting the conductive nanostructure as well as molding the conductive nanostructure in various shapes.

According to an embodiment, the electrical discharge machining with respect to the conductive nanostructure is carried out in an air environment. In the specifications, "air environment" may be considered in comparison with "liquid fluid-environment" in which a conventional electrical discharge machining is performed. The kinds and pressure of gas corresponding to the air environment are applicable without limitation. The process condition of the electrical discharge machining according to an embodiment of the present invention is controlled to an air environment unlike a conventional electrical discharge machining. For this reason, the present invention can overcome disadvantages that a processing by-product mixed in the fluid pollutes the conductive nanostructure being a processing object during the electrical discharge machining, and the fluid damages the conductive nanostructure with fine structure. Accordingly, fine processed materials such as nanostructures can be accurately processed.

Figure 2:
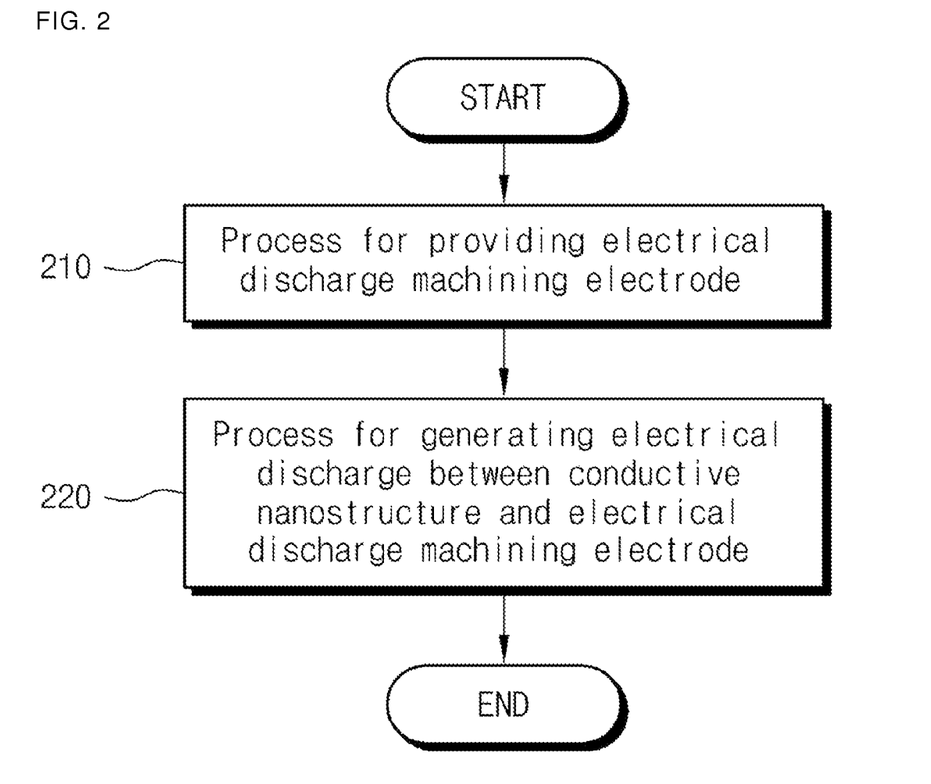
FIG. 2 is a schematic flowchart illustrating an electrical discharge machining process for a conductive nanostructure in accordance with an embodiment of the present invention.

FIG. 2 is a schematic flowchart illustrating an electrical discharge machining process for a conductive nanostructure in accordance with an embodiment of the present invention. Referring to FIG. 2, the electrical discharge machining process for the conductive nanostructure may include a process for providing an electrical discharge machining electrode (block 210) and a process for generating an electrical discharge between the electrical discharge machining electrode and the conductive nanostructure (block 220). The conductive nanostructure of FIG. 2 may be substantially the same as the conductive nanostructure arranged in the conductive substrate described in the above-mentioned embodiments of FIG. 1.

In advance, the block 210 of FIG. 2, the electrical discharge machining electrode is provided. The electrical discharge machining electrode may be formed in a wire shape or a cylindrical shape. The electrical discharge machining electrode may be made of brass, graphite, silver-tungsten alloy, copper-tungsten alloy, iron, copper, zinc, phosphor bronze and aluminum or alloy thereof. The electrical discharge machining electrode is electrically connected to an external power supply. The external power supply is electrically connected to the conductive substrate.

In the block 220 of FIG. 2, an electrical discharge is created between the electrical discharge machining electrode and the conductive nanostructure. First, the electrical discharge machining electrode and the conductive nanostructure are isolated and arranged in an air environment. Then, a voltage from the external power supply is applied between the electrical discharge machining electrode and the conductive nanostructure. The electrical discharge machining electrode in which the voltage is applied is closed to the conductive nanostructure to generate an electrical discharge to the conductive nanostructure. The conductive nanostructure is processed by this way. Concretely, the generated electrical discharge phenomenon may be a spark with high frequency. The spark raises temperature of a part of the electrical discharge machining electrode highly. The part of the electrical discharge machining electrode locally melts the neighboring conductive nanostructure to evaporate it. Thus, the conductive nanostructure can be processed.

In en embodiment, the electrical discharge machining electrode uses a wire with several μm diameter that is made of brass. By applying a voltage a voltage more than 0V and under 200V between the conductive nanostructure including the wire and the CNT, an electrical discharge cutting for controlling the length of the conductive nanostructure can be carried out.

Figure 3:
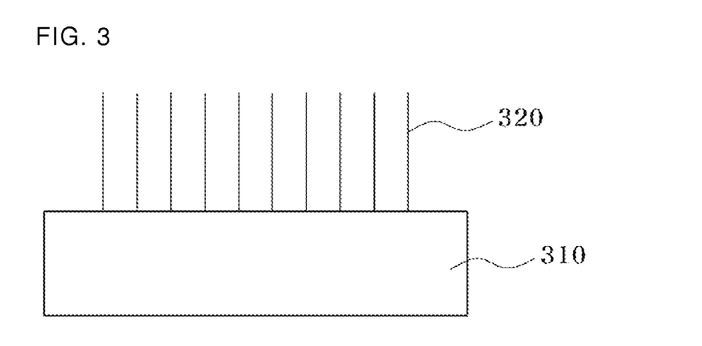
FIGS. 3 to 5 are schematically cross-sectional views showing an electrical discharge machining process for a conductive nanostructure in accordance with an embodiment of the present invention.
Figure 4:
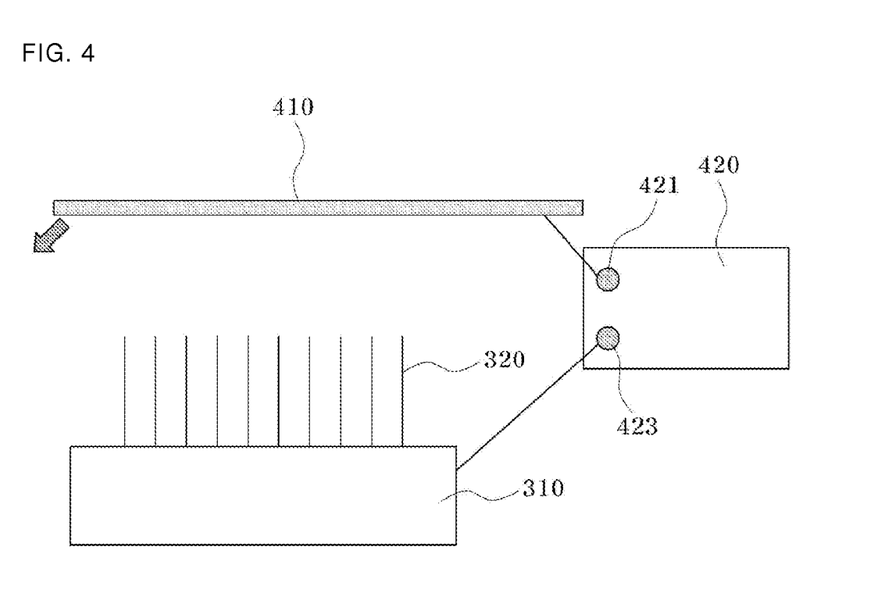
Figure 5:
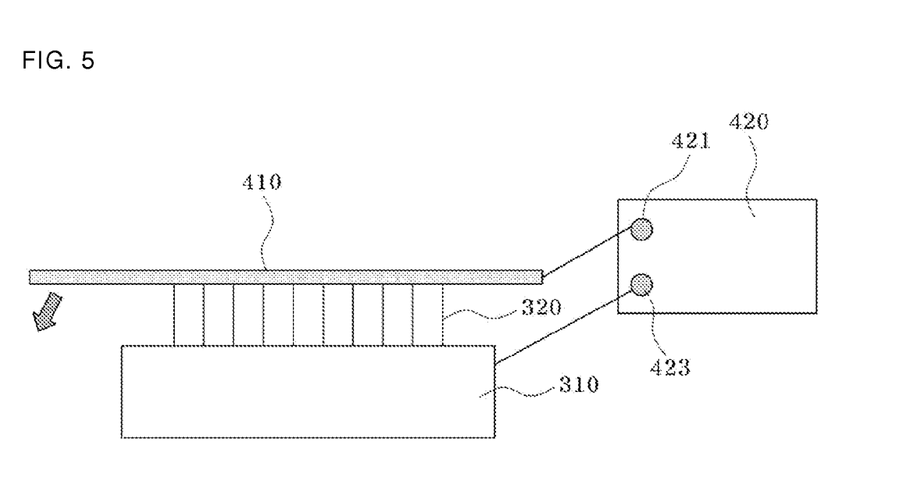

FIGS. 3 to 5 are schematically cross-sectional views showing an electrical discharge machining process for a conductive nanostructure in accordance with an embodiment of the present invention. The conductive nanostructure is processed in single or plural. Hereinafter, a method for processing a plurality of conductive nanostructures will be explained as an embodiment accompanying drawings. Referring to FIG. 3, a conductive nanostructure 320 is arranged on a conductive substrate 310. The conductive nanostructure 320 may be aligned on the conductive substrate 310 at a regular interval. The conductive nanostructure 320 may be vertically arranged on the conductive substrate 310.

The conductive nanostructure 320 and the conductive substrate 310 are substantially the same as those of FIGS. 1 and 2, and therefore, to avoid description duplication, their description is omitted herein. In arranging the conductive nanostructure on the conductive substrate 310, various known methods may be employed. As an example, a metal catalyst such as iron, cobalt, nickel and the like is formed on the conductive substrate 310. After that, process gas like acetylene gas ($C_2H_2$) is provided to the conductive substrate 310 where the metal catalyst is formed and various kinds of CVDs are employed, thereby forming a nanostructure like CNT on the conductive substrate 310 regularly.

Referring to FIG. 4, an electrical discharge machining electrode 410 is provided. The electrical discharge machining electrode 410 is formed in a wire shape, but not limited to this and formed in various shapes such as a cylindrical shape. The material and shape of the electrical discharge machining electrode 410 are substantially the same as that of FIGS. 1 and 2, and therefore, to avoid description duplication, their description is omitted herein. The electrical discharge machining electrode 410 is electrically connected to one terminal 421 of an external power supply 420 in an air environment and the conductive substrate 310 is electrically connected to one terminal 423 of an external power supply 420 in an air environment. Therefore, conductive substrate 310 is electrically connected to one terminal of external power supply 420. Resultantly, the conductive nanostructure 320 electrically connected to the conductive substrate 310 applies a voltage between the conductive nanostructure 320 and the electrical discharge machining electrode 410.

After the voltage is applied between the electrical discharge machining electrode 410 and the conductive substrate 310, for the electrical discharge machining, the interval between the electrical discharge machining electrode 410 and the conductive substrate 310 can be adjust. By moving the electrical discharge machining electrode 410 to be closed to the conductive nanostructure 320 or moving the conductive nanostructure 320 to be closed to the electrical discharge machining electrode 410, it is possible to reduce the interval between the electrical discharge machining electrode 410 and the conductive substrate 310. A discharge phenomenon is created by sufficiently closing the electrical discharge machining electrode 410 to a position of the conductive nanostructure 320 to be molded, thereby molding and processing. As not shown, an apparatus having the electrical discharge machining electrode 410 can properly control velocity of the electrical discharge machining electrode 410, a voltage applied between the electrical discharge machining electrode 410 and the conductive nanostructure 320, and the position of the conductive nanostructure 320 to be molded according to a molding target.

Referring to FIG. 5, the conductive nanostructure 320 processed with a predetermined length by the electrical discharge machining electrode 410 is arranged on the conductive substrate 310.

As mentioned above, the process condition of the electrical discharge machining according to an embodiment of the present invention is controlled to an air environment unlike a conventional electrical discharge machining carried out in fluid. For this reason, the present invention can overcome disadvantages that a processing by-product mixed in the fluid pollutes the conductive nanostructure being a processing object during the electrical discharge machining, and the fluid damages the conductive nanostructure with fine structure. Accordingly, fine processed materials such as nanostructures can be accurately.

Also, the inventor of the present invention noticed that currents of several mA to A flow along the conductive nanostructure and the conductive substrate during the electrical discharge machining. The inventor noticed that a contact resistance on interfaces between the conductive nanostructure and the conductive substrate is reduced by currents flowing on the conductive nanostructure and the conductive substrate. It is estimated that conductive compound is generated on interfaces between the conductive nanostructure and the conductive substrate by the currents, and the generated conductive compound reduces the contact resistance on the interfaces. Also, the conductive compound on the interfaces increases physical adhesion between the conductive nanostructure and the conductive substrate, thereby stably arranging the conductive nanostructure on the conductive substrate.

Like this, through the electrical discharge machining according to embodiments of the present invention, the electrical property and structural stability such as the contact resistance between the conductive nanostructure and the conductive substrate can be improved.

Figure 6:
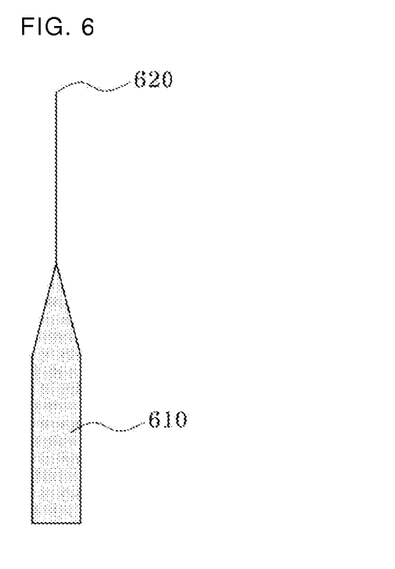
FIGS. 6 to 8 are schematically cross-sectional views showing a method for manufacturing a field emitter in accordance with an embodiment of the present invention.
Figure 7:
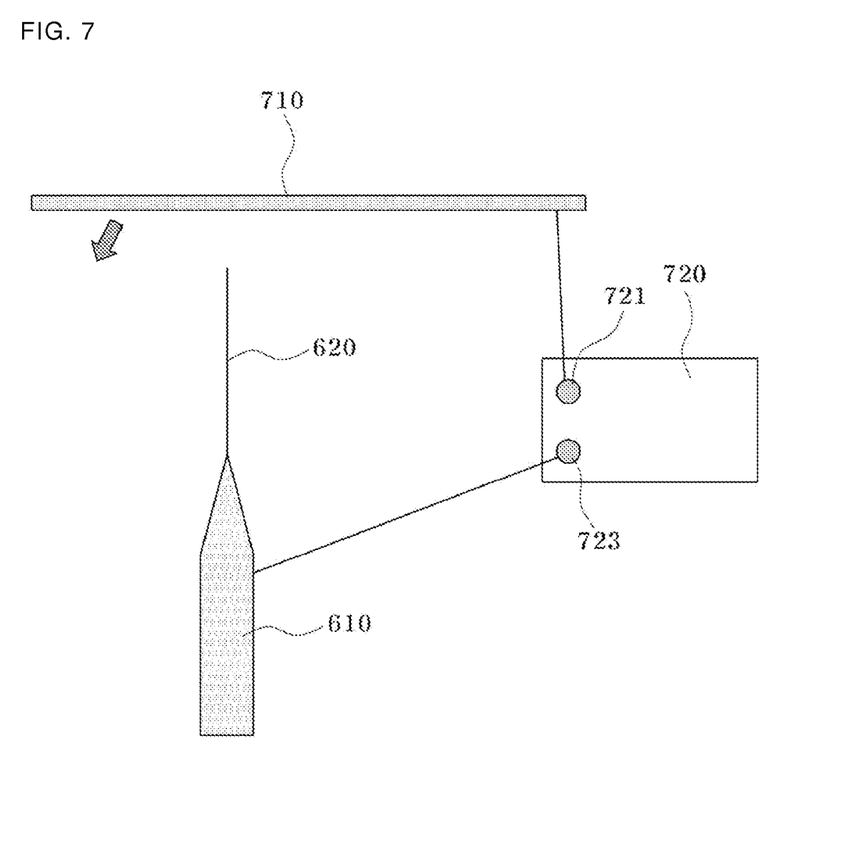
Figure 8:
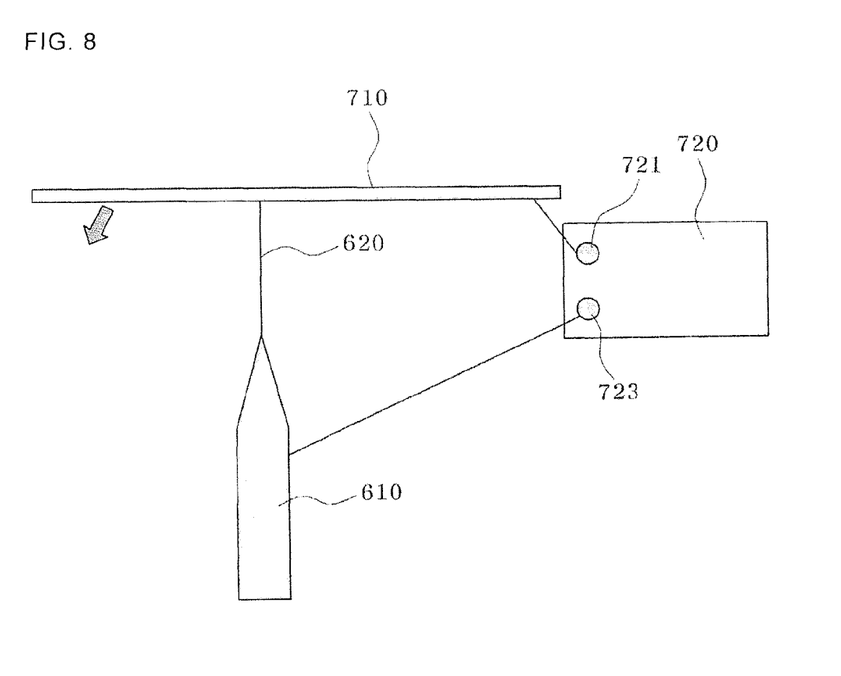

FIGS. 6 to 8 are schematically cross-sectional views showing a method for manufacturing a field emitter in accordance with an embodiment of the present invention. Referring to FIG. 6, a conductive nanostructure 620 arranged on a conductive tip 610 and including CNT is formed. The conductive nanostructure 620 may include metal or metallic oxide additionally.

The conductive tip 610 may be formed of tungsten, nickel, molybdenum, tantalum, niobium, or alloy thereof, but not limited to this. As shown in FIGS, the conductive tip 610 may have an apex that one end of the conductive tip 610 is sharp. As an embodiment, the conductive tip 610 with the apex is formed by electrochemically etching a metal wire in hydration solution.

As an example, a tungsten tip with an apex is formed by electrochemically etching a tungsten wire in potassium hydroxide or sodium hydroxide. As another example, an aluminum tip with an apex is formed by electrochemically etching an aluminum wire in sulfuric acid mixed with hydrogen chloride solution. As the other example, the apex is formed on the conductive tip 610 by mechanically polishing a metal wire.

Various known methods are applicable in forming the conductive nanostructure 620 arranged on the conductive tip 610. According to an embodiment, Korean Laid-Open Patent Publication No. 2006-0098225 discloses method for forming electron emitter tip by copper-carbon nanotube composite electroplating, Korean Laid-Open Patent Publication No. 2010-0024875 discloses CNT/metal composite cable, and Korean Laid-Open Patent Publication No. 2010-0026102 discloses a method for growing nanostructure on tip and a method for adhering material on tip. The above prior arts are applicable.

Referring to FIG. 7, an electrical discharge machining electrode 710 is provided. The electrical discharge machining electrode 710 is formed in a wire shape, but not limited to this. The material and shape of the electrical discharge machining electrode 710 are substantially the same as that of FIGS. 1 and 2, and therefore, to avoid description duplication, their description is omitted herein.

The electrical discharge machining electrode 710 is electrically connected to one terminal 721 of an external power supply 720 in an air environment. The conductive tip 610 is electrically connected to one terminal 723 of external power supply 720. Resultantly, the conductive nanostructure 620 electrically connected to the conductive tip 610 and the electrical discharge machining electrode 710 may apply a voltage between the conductive nanostructure 620 and the electrical discharge machining electrode 710.

After the voltage is applied between the electrical discharge machining electrode 710 and the conductive substrate 620, the interval between the electrical discharge machining electrode 710 and the conductive substrate 620 can be adjust. A discharge phenomenon is created by sufficiently closing the electrical discharge machining electrode 710 to a position of the conductive nanostructure 620 to be molded, thereby molding and processing. As not shown, an apparatus having the electrical discharge machining electrode 710 can properly control velocity of the electrical discharge machining electrode 710, a voltage applied between the electrical discharge machining electrode 710 and the conductive nanostructure 720, and the position of the conductive nanostructure 720 to be molded according to a molding target.

The electrical discharge machining may be a cutting process for the conductive nanostructure 620 to have a predetermined length. If the conductive nanostructure 620 is applied as an electron-emitting element, it is very important that the length of the conductive nanostructure 620 is finely controlled by applications. The inventor of the present invention noticed that the aspect ratio (length element with respect to diameter) of the conductive nanostructure 620 is related to the size of electron emission threshold field of the electron emission element. In other words, the larger the aspect of the conductive nanostructure 620 is, the lower the electron emission threshold field is. As a result, electrons are emitted in a relatively low voltage. Also, the inventor noticed that the uniformity of the electron emission field becomes improved as a surface uniformity of an apex cross-section of the conductive nanostructure is excellent (that is, a surface step is small). Accordingly, a technique for finely and reproducibility controlling the length and cross-section of the conductive nanostructure 620 contributes to manufacture electron emission elements with uniform electron emission threshold field size.

Referring to FIG. 8, the conductive nanostructure 620 processed with a predetermined length by the electrical discharge machining electrode 710 is arranged on the conductive tip 610.

In the above embodiments referring to FIGS. 6 to 8, single conductive nanostructure 620 arranged on single conductive tip 610 is described. In some embodiments, even though at least one more than conductive nanostructures are formed on tow or more conductive tip 610, the substantially same methods can be applied. The conductive nanostructure 620 molded according to the present invention is capable of controlling the surface step of the apex under 1 μm by the electrical discharge machining. More preferably, the surface step is ranged from 0.5 μm to 1 μm.

As mentioned above, the process condition of the electrical discharge machining according to an embodiment of the present invention is controlled to an air environment unlike a conventional electrical discharge machining. For this reason, the present invention can overcome disadvantages that a processing by-product mixed in the fluid pollutes the conductive nanostructure being a processing object during the electrical discharge machining, and the fluid damages the conductive nanostructure with fine structure. Furthermore, fine processed materials such as nanostructures can be accurately by carrying out the electrical discharge machining in an air environment.

Additionally, currents of several mA to A flow along the conductive nanostructure and the conductive tip during the electrical discharge machining. The inventor noticed that a contact resistance on interfaces between the conductive nanostructure and the conductive substrate is reduced by currents flowing on the conductive nanostructure and the conductive tip. It is estimated that conductive compound is generated on interfaces between the conductive nanostructure and the conductive tip by the currents, and the generated conductive compound reduces the contact resistance on the interfaces. Also, the conductive compound on the interfaces increases physical adhesion between the conductive nanostructure and the conductive tip, thereby stably arranging the conductive nanostructure on the conductive substrate. Like this, the electrical property and structural stability between the conductive nanostructure and the conductive tip can be enhanced by the electrical discharge machining according to the embodiments of the present invention.

MODE FOR THE INVENTION

Example 1

Nanostructure Formation Including CNT on W-Tip

A single-wall CNT synthesized using arc discharge was prepared. Then, a purified CNT was obtained by nitric treatment. After sodium tungstate ($Na_2WO_4 \cdot 2H_2O$) and the purified CNT were mixed in DMF (N,N-dimethyl formamide), they were dispersed through an ultrasonic treatment to prepare a mixed solution.

W-tip with an apex at the end thereof and counter electrode were immersed into the mixed solution. Then, a voltage was applied between the W-tip and the counter electrode in the mixed solution. Through this, CNT was gathered at the end of the W-tip, and at the same time, plating is processed by tungsten oxide ion dissolved in the sodium tungstate. On the W-tip, a tungsten oxide/CNT composite was formed.

The W-tip in which the tungsten oxide/CNT composite was formed was withdrawn from the mixed solution. Then, the tungsten oxide/CNT composite was in contact with a teflon panel to be dried. While drying, a solvent was evaporated to form one-dimensional conductive nanostructure.

A conductive nanostructure was prepared by an electrical discharge machining with respect to the obtained conductive nanostructures in an air environment.

Comparative Example 1

Comparative example 1 was performed the same as example 1, but an electrical discharge machining was not carried out with respect to a conductive nanostructure and was dried on a teflon panel to obtain the conductive nanostructure.

Manufacturing Field Emitter

Example 2

An electrical discharge machining was performed with respect to the conductive nanostructure manufactured from Example 1 in an air environment to manufacture a field emitter. The conductive nanostructure formed on the W-tip was obtained by the field emitter.

A conductive nanostructure was prepared by an electrical discharge machining with respect to the obtained conductive nanostructures in an air environment. Using a wire in an air environment, the conductive nanostructure on the W-tip was cut at a predetermined length by the electrical discharge machining. The wire was made of brass having 0.3 mm diameter, and 80V was applied between the W-tip and the wire.

That is, the EDM treated emitter was prepared as the conductive nanostructure of Example 1.

Comparative Example 2

For comparing with Example 2 about a field emission effect, a prinstine emitter was prepared as the conductive nanostructure of Example 1.

Experimental Example

Before/after the electrical discharge machining, electrical property was evaluated with respect to the conductive nanostructures of Example 1 and Comparative Example 1, respectively. To Comparative example 1 before EDM and Example 1 after EDM, a resistance of the conductive nanostructure, and a contact resistance and total resistance between the W-tip and the conductive nanostructure were calculated, respectively. And, XPS (X-ray photoelectron spectroscopy) was carried out before/after EDM, composite variation of the W-tip and the conductive nanostructure to be generated by EDM was observed.

Also, field emission experiment with respect to Example 2 and Comparative example 2 was performed to measure current discharged according to size of field that is formed at each of conductive nanostructure of Example 2 and Comparative example 2. As aforementioned, the conductive nanostructures as the field emitters of Example 2 and Comparative example 2 were formed under the same condition of Example 1 and Comparative example 1.

Evaluation

Figure 9:
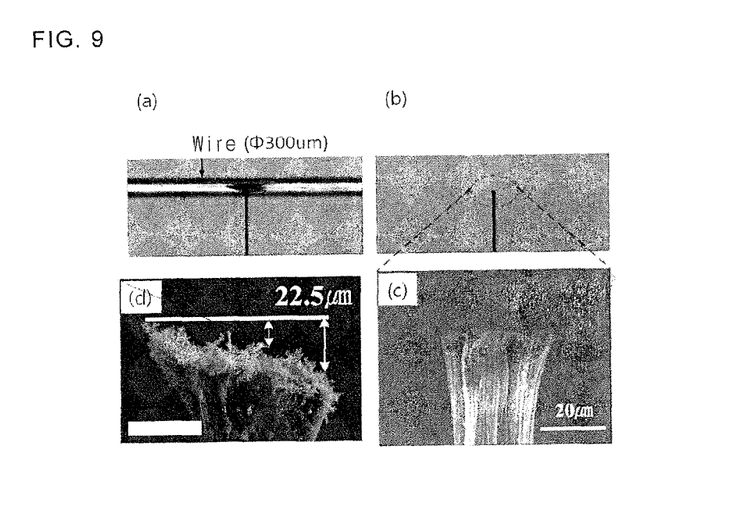
FIG. 9 is a SEM (scanning electron microscopy) image of a conductive nanostructure on a conductive tip in accordance with an embodiment of the present invention.

FIG. 9 is a SEM (scanning electron microscopy) image of a conductive nanostructure on a conductive tip in accordance with an embodiment of the present invention.

(a) of FIG. 9 shows that EDM is performing according to an embodiment of the present invention. (b) and (c) of FIG. 9 show the conductive nanostructure after EDM. (d) of FIG. 9 shows the conductive nanostructure of Comparative example 1 when EDM was not performed.

Referring to (b) and (c) of FIG. 9, it can be seen that the cross-section of the conductive nanostructure was uniformly cut by EDM. Referring to (c) of FIG. 9, it wad measured that a surface step at the cross-section of the conductive nanostructure after EDM was about 0.9 μm.

On the other hand, referring to (d) of FIG. 9, a maximum surface step at the cross-section of the conductive nanostructure was about 22.5 μm in Comparative example 1 in which EDM was not performed.

Accordingly, it can be seen that EDM reduced the surface step at the cross-section of the conductive nanostructure as well as maintained uniform forging welding.

Figure 10:
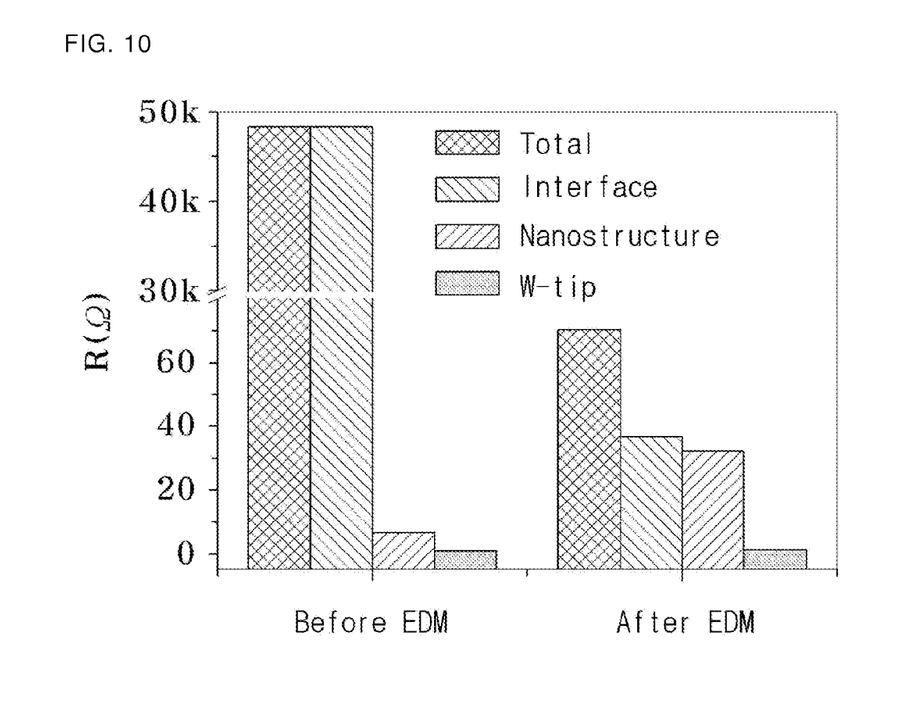
FIG. 10 is a graph for showing electric property information of a conductive nanostructure on a conductive tip in accordance with another embodiment of the present invention.

FIG. 10 is a graph for showing electric property information of a conductive nanostructure on a conductive tip in accordance with another embodiment of the present invention. kΩΩ

Referring to FIG. 10, an electrical resistance was decreased by EDM according to an embodiment of the present invention. First, total resistance of the conductive tip and the conductive nanostructure was decreased from 48 kΩ to 70Ω. A surface resistance between the conductive tip and the conductive nanostructure was decreased from 48 kΩ to 36.5Ω. A resistance of the conductive nanostructure was increased from 6.58Ω to 32Ω, and a resistance of the W-tip was finely increased from 1.1Ω to 1.2Ω.

Thus, it was found that the total resistance and the contact resistance were dramatically decreased by EDM.

Figure 11:
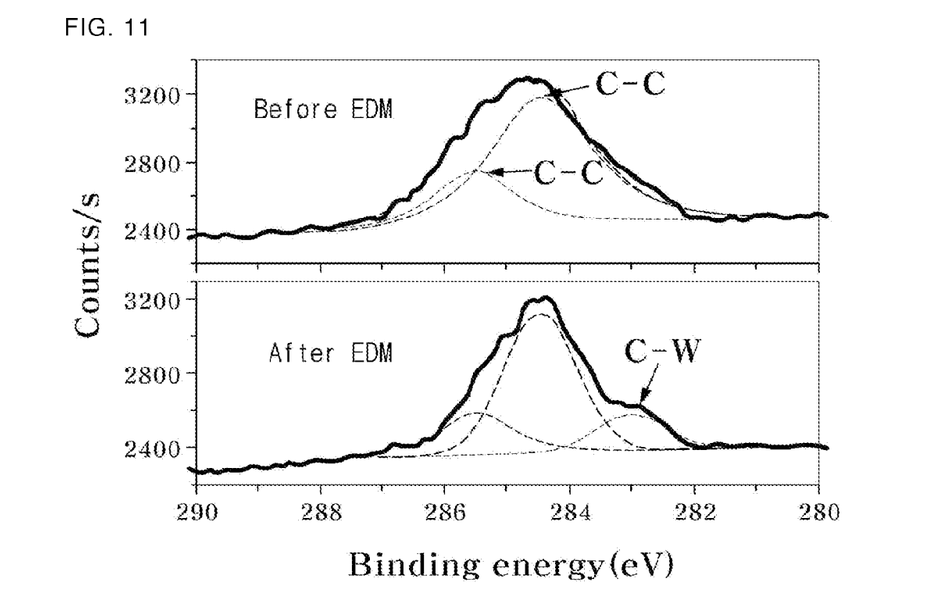
FIG. 11 is a graph for showing a component analysis result of a conductive nanostructure on a conductive tip in accordance with another embodiment of the present invention.

FIG. 11 is a graph for showing a component analysis result of a conductive nanostructure on a conductive tip in accordance with another embodiment of the present invention. As shown in FIG. 11, it was found that a peak having a bonding energy of about 283.5 eV after EDM was newly created according to the XPS. The peak corresponds to the bonding energy between carbon and tungsten. Therefore, it can be seen that a conductive compound like tungsten was generated on interfaces a conductive nanostructure including the W-tip and the CNT by EDM. It was believed that the generated conductive compound performed a function to reduce total resistance and the surface resistance of the W-tip and the nanostructure.

Figure 12:
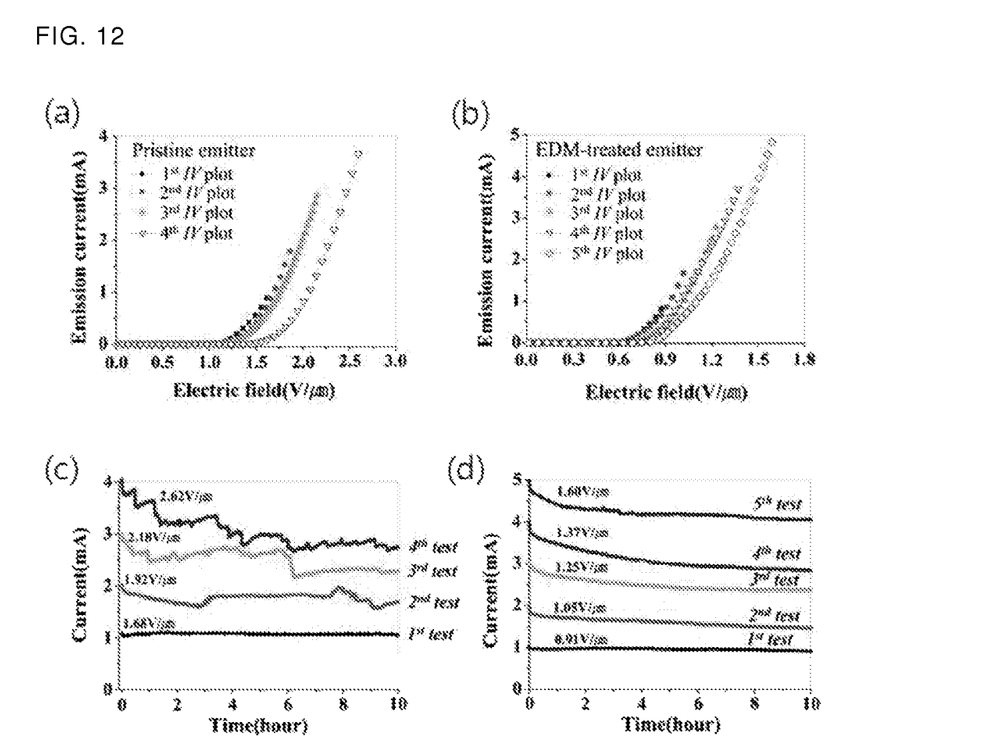
FIGS. 12 to 14 are graphs showing field emission properties of a conductive nanostructure in accordance with an embodiment of the present invention.

FIG. 12 is a graph showing a field emission property of a conductive nanostructure in accordance with an embodiment of the present invention. (a) and (c) of FIG. 12 are graphs showing a field emission property of Example 2, and (b) and (d) of FIG. 12 are graphs showing a field emission property of Comparative example 2.

Referring to (a) and (b) of FIG. 12, the measurement result of discharging current depending on a field size formed at the conductive nanostructure can be confirmed. In Example 2, current and voltage (IV-plot) of the same conductive nanostructure were sequentially measured at four times. Between 1th and 2th current-voltage test, 1th current-time was measured (while applying constant field, current variation according to time was tested). 3th and 4th current-voltage tests were performed in the same way. In Example 2, current-voltage test sequentially was performed at five times.

In Comparative example 2, current-time test was performed between current-voltage tests in the same ways as Example 2. Current-voltage test was performed at four times.

In case that a threshold field is defined when a discharging current density is about 10 mA/cm, (a) of Example 2 of FIG. 12 indicated that a threshold field value was from 0.58 V/μm to 0.74 V/μm. (b) of Comparative example 2 of FIG. 12 indicated that a threshold field value was from 1.10 V/μm to 1.36 V/μm.

Like this, it was found that the EDM treated conductive nanostructure has low threshold field value to have a relatively good field emission property.

In the current-voltage test of Example 2 and Comparative example 2, the threshold field value becomes increased as measurement times are increased. The reason for this is that the conductive nanostructure is damaged while measuring, so that the length of the conductive nanostructure is shortened. As the length of the conductive nanostructure becomes shortened, an aspect ratio (a ratio value with respect to diameter of the conductive nanostructure) is small. This leads to increase the threshold field of field emission property.

(c) of FIG. 12 is a graph showing a discharge current as time passes in case that field respectively corresponding to initial current 1 mA, 2 mA, 3 mA, 4 mA, and 5 mA is maintained in Example 2. (d) of FIG. 12 is a graph showing a discharge current as time passes in case that field respectively corresponding to initial current 1 mA, 2 mA, 3 mA, and 4 mA is maintained in Comparative Example 2.

Whereas (c) of FIG. 12 shows stable field discharge property as time passes, (d) of FIG. 12 shows that discharge current is varied irregularly as time passes.

Like this, it can be seen that the EDM treated conductive nanostructure of Example 2 was excellent and had stable field emission property than that of Comparative example 2.

Figure 13:
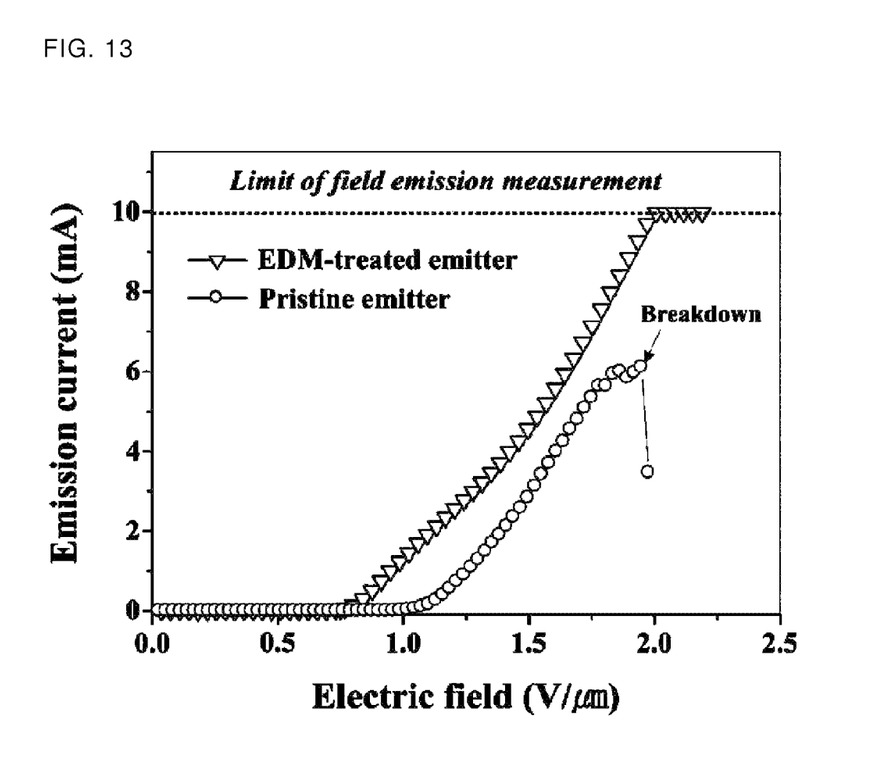

FIG. 13 shows a field emission property of a conductive nanostructure before/after EDM. Example 2 (EDM treatment was performed) is shown as EDM-treated emitter, and Comparative Example 2 is shown as Prinstine emitter. The conductive nanostructures of Example 2 and Comparative example 2 are formed under the same condition as Example 1 and Comparative example 1.

The threshold field among field emission properties of the conductive nanostructure in Example 2 is within 1.0 V/μm, and more preferably is 0.74 V/μm. In contrast, the threshold of the conductive nanostructure in Comparative example 2 is more than 1.0 V/μm, and more preferably is more than 1.36 V/μm.

In addition, total current was reached to 10 mA within 2.0 V/μm of field applied to the conductive nanostructure of Example 2, and total discharge current was reached to 6 mA within 2.0 V/μm of field applied to the conductive nanostructure of Comparative example 2. In other words, total discharge current is not over 6 mA in the conductive nanostructure of Comparative example 2. In Example 2, total discharge current may be more than 10 mA, but obtained 10 mA due to limitation of measurement apparatus. For this reason, total discharge current is not limited to 10 mA in Example 2.

Figure 14:
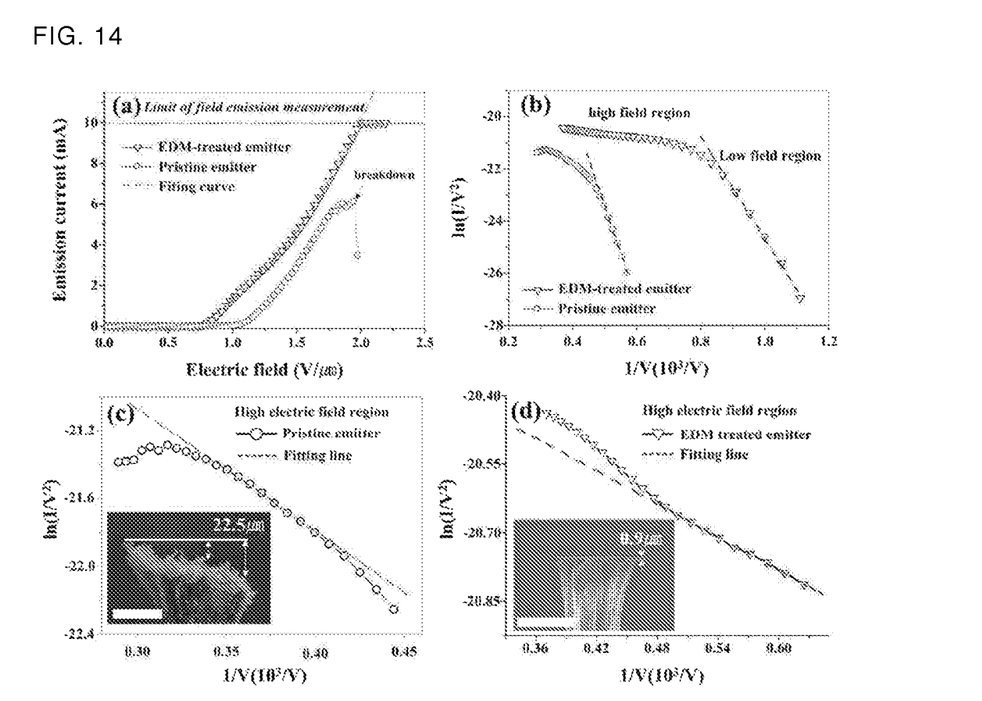

(a), (b), and (c) of FIG. 14 are Fowler-Nordhein plots of field emission properties of Example 2 and Comparative example 2. Referring to (a), (b), and (c) of FIG. 14, it can be seen that the field emission properties of the conductive nanostructure comply with Fowler-Nordhein field emission.

As described above, the present invention provides an air signboard having coupling bar as a coupling medium of a support and an air pillar to easily couple an air pillar.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method for molding a conductive nanostructure comprising the steps of:
    (a) a process for forming a conductive nanostructure arranged on a conductive substrate; and
    (b) an electrical discharge machining process for the conductive nanostructure in an air environment,
    wherein the step (b) comprises forming a conductive interfacial compound between the conductive substrate and the conductive nanostructure.

2. The method of claim 1, wherein a contact resistance between the conductive substrate and the conductive nanostructure is reduced in the (b) step.

3. The method of claim 1, wherein the conductive nanostructure includes CNT (carbon nanotube).

4. The method of claim 1, wherein the conductive nanostructure additionally includes metal or metallic oxide.

5. The method of claim 1, wherein the (b) step includes an electrical discharge cutting process for the conductive nanostructure to have a predetermined length.

6. The method of claim 1, wherein the (b) step comprises:
    (b1) a process for providing an electrical discharge machining electrode; and
    (b2) a process for generating an electrical discharge between the conductive nanostructure and the electrical discharge machining electrode.

7. The method of claim 1, the (b) step comprises the steps of:
    (b1) a process for isolating and arranging the conductive nanostructure and the electrical discharge machining electrode in an air environment;
    (b2) a process for applying a voltage between the conductive nanostructure and the electrical discharge machining electrode; and
    (b3) a process for closing the conductive nanostructure to the electrical discharge machining electrode in which the voltage is applied to generate an electrical discharge.

8. The method of claim 6, wherein the electrical discharge machining electrode is formed in a wire or cylindrical shaped.

9. The method of claim 6, wherein the electrical discharge machining electrode is at least one selected from the group consisting of brass, graphite, silver-tungsten alloy, copper-tungsten alloy, iron, copper, zinc, phosphor bronze and aluminum or alloy thereof.

* * * * *